United States Patent
Bostick et al.

(10) Patent No.: US 9,954,784 B2
(45) Date of Patent: *Apr. 24, 2018

(54) PREDICTIVE VPN BANDWIDTH BALANCING BASED ON WEATHER DATA AND SOCIAL MEDIA SENTIMENT

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); David W. Watts, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/263,642

(22) Filed: Sep. 13, 2016

(65) Prior Publication Data
US 2016/0380897 A1    Dec. 29, 2016

Related U.S. Application Data

(63) Continuation of application No. 14/496,324, filed on Sep. 25, 2014, now Pat. No. 9,515,937.

(51) Int. Cl.
| | |
|---|---|
| *H04L 12/801* | (2013.01) |
| *H04L 12/803* | (2013.01) |
| *H04L 29/08* | (2006.01) |
| *H04L 12/46* | (2006.01) |
| *H04L 12/58* | (2006.01) |

(52) U.S. Cl.
CPC ........ *H04L 47/125* (2013.01); *H04L 12/4641* (2013.01); *H04L 47/122* (2013.01); *H04L 47/127* (2013.01); *H04L 67/18* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 8,332,454 B1 | 12/2012 | Cona et al. | |
| 8,504,716 B2 | 8/2013 | Samuels et al. | |

(Continued)

OTHER PUBLICATIONS

Non Final Office Action in U.S. Appl. No. 14/496,324 dated May 23, 2016; 22 Pages.

(Continued)

*Primary Examiner* — Steven H Nguyen
(74) *Attorney, Agent, or Firm* — Daniel Simek; Hoffman Warnick LLC

(57) ABSTRACT

The disclosure is directed to a method for balancing VPN network bandwidth. A method in accordance with an embodiment includes: obtaining weather data and social media sentiment for a plurality of geographical regions; analyzing the weather data and the social media sentiment for factors that may influence network bandwidth usage in each of the plurality of geographical regions; predicting network bandwidth requirements for each of the plurality of geographical regions based on the analysis of the weather data and the social media sentiment; and balancing the network bandwidth among the plurality of geographical regions based on the predicted network bandwidth requirements.

12 Claims, 3 Drawing Sheets

(56) References Cited

U.S. PATENT DOCUMENTS

| | | |
|---|---|---|
| 8,559,450 B2 | 10/2013 | Ongole et al. |
| 9,515,937 B2 * | 12/2016 | Bostick ................ H04L 47/122 |
| 2007/0214483 A1 | 9/2007 | Bou-Abboud |
| 2008/0273591 A1 * | 11/2008 | Brooks ................ H04N 7/1675 375/240.01 |
| 2011/0225016 A1 * | 9/2011 | Boss ...................... G06Q 10/06 705/7.25 |
| 2013/0042005 A1 | 2/2013 | Boss et al. |
| 2016/0014468 A1 | 1/2016 | Dadheech et al. |

OTHER PUBLICATIONS

Final Office Action in U.S. Appl. No. 14/496,324 dated Jun. 27, 2016; 12 Pages.

Notice of Allowance and Fee(s) Due in U.S. Appl. No. 14/496,324 dated Aug. 9, 2016; 23 Pages.

* cited by examiner

PREDICTIVE VPN BANDWIDTH BALANCING BASED ON WEATHER DATA AND SOCIAL MEDIA SENTIMENT

TECHNICAL FIELD

The present invention relates generally to VPN bandwidth balancing, and more particularly, to predictive VPN bandwidth balancing based on weather data and social media sentiment.

RELATED ART

The mobility of employees has rapidly increased with the implementation of bring your own device (BYOD) policies by employers. BYOD generally refers to the policy of permitting employees to bring personally owned mobile devices (laptops, tablets, smart phones, etc.) to and from their workplace, and to use those devices to remotely access privileged company information and applications. By allowing employees to access corporate systems from a multitude of devices, employees can be productive without being tied to their office desk.

To access corporate systems, employees typically use a Virtual Private Network (VPN) to gain access to an internal company network. The VPN receives all network traffic, and provides a secure gateway into the company network. As a VPN typically moderates all network traffic coming into a company network, it requires a significant amount of resources in the form of network bandwidth.

The amount of network traffic flowing through a VPN may vary significantly depending, for example, upon how many employees are using the VPN at any given time. It is currently difficult to estimate how much traffic a VPN will receive in a given day for a given geographical region, making it difficult to allocate VPN bandwidth resources effectively.

To ensure that a VPN has adequate bandwidth to serve all users in all geographical regions on a given day, real-time monitoring is often used. Such monitoring typically examines the amount of VPN bandwidth being used in each geographical region. If one geographical region requires greater bandwidth resources, the bandwidth can be workload balanced by directing bandwidth from another geographical region that has less need for that bandwidth to the geographical region that requires greater bandwidth. One limitation of real time monitoring, however, is that one geographical region must become over-subscribed (therefore providing poor performance to users) before bandwidth balancing can occur.

SUMMARY

A first aspect of the invention provides a method for balancing network bandwidth, comprising: obtaining weather data and social media sentiment for a plurality of geographical regions; analyzing the weather data and the social media sentiment for factors that may influence network bandwidth usage in each of the plurality of geographical regions; predicting network bandwidth requirements for each of the plurality of geographical regions based on the analysis of the weather data and the social media sentiment; and balancing the network bandwidth among the plurality of geographical regions based on the predicted network bandwidth requirements.

A second aspect of the invention provides a system for balancing network bandwidth comprising: a data collection system for obtaining weather data and social media sentiment for a plurality of geographical regions; an analyzing system for analyzing the weather data and the social media sentiment for factors that may influence network bandwidth usage in each of the plurality of geographical regions; a bandwidth prediction system for predicting network bandwidth requirements for each of the plurality of geographical regions based on the analysis of the weather data and the social media sentiment; and a network balancing system for balancing the network bandwidth among the plurality of geographical regions based on the predicted network bandwidth requirements.

A third aspect of the invention provides a computer program product comprising program code embodied in at least one computer-readable storage medium, which when executed, enables a computer system to implement a method for balancing network bandwidth, the method comprising: obtaining weather data and social media sentiment for a plurality of geographical regions; analyzing the weather data and the social media sentiment for factors that may influence network bandwidth usage in each of the plurality of geographical regions; predicting network bandwidth requirements for each of the plurality of geographical regions based on the analysis of the weather data and the social media sentiment; and balancing the network bandwidth among the plurality of geographical regions based on the predicted network bandwidth requirements.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
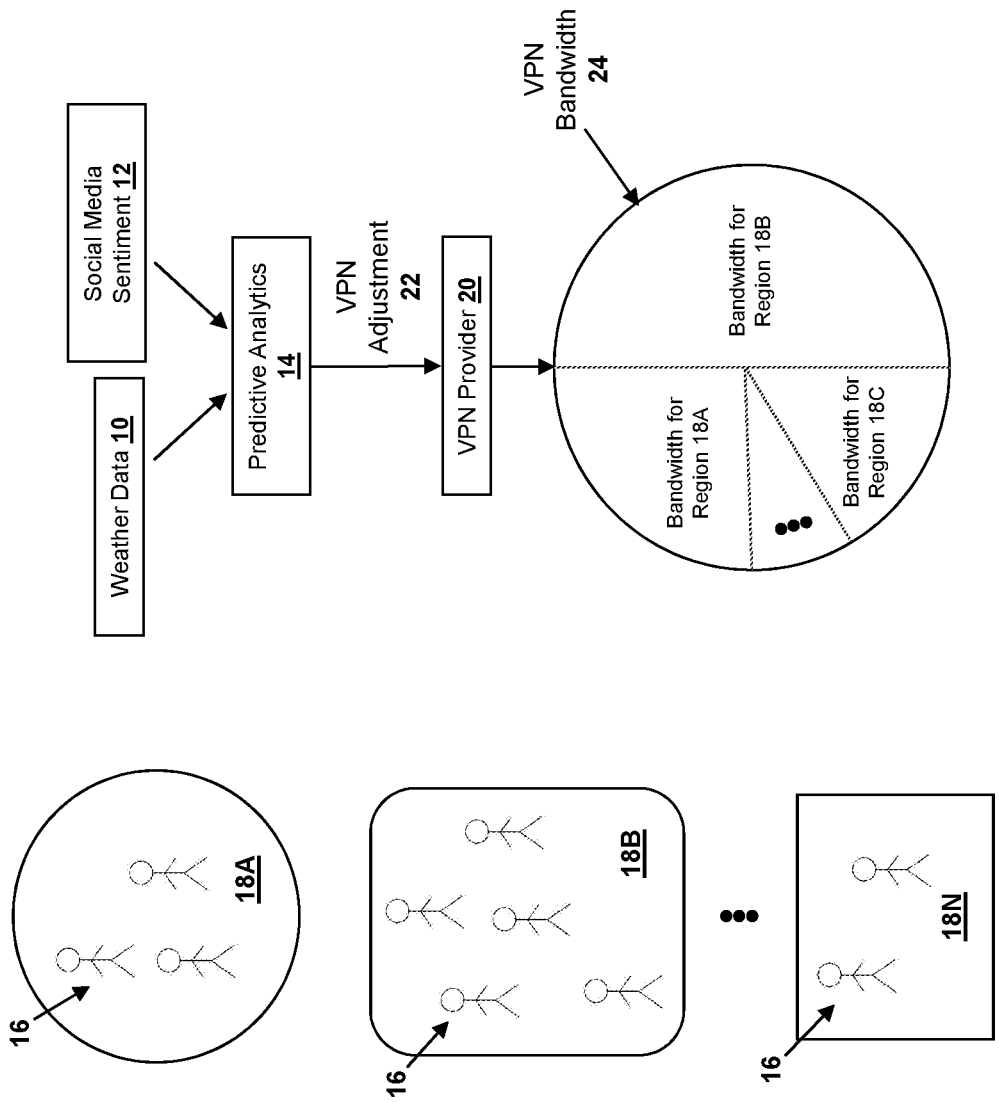
FIG. 1 depicts a system for predictive VPN bandwidth balancing based on weather data and social media sentiment, according to embodiments.

The present invention relates generally to VPN bandwidth balancing, and more particularly, to predictive VPN bandwidth balancing based on weather data and social media sentiment. As depicted in FIG. 1, weather data 10 and social media sentiment 12 are used by a predictive analytics system 14 to predict the number of employees 16 that will be working from home (or elsewhere remotely away from the office) in a given geographical region 18 (e.g., geographical regions 18A, 18B, . . . 18N), on a given day, and to predict and preemptively adjust the VPN bandwidth provided to each geographical region 18 accordingly.

A VPN provider 20 may use VPN adjustment data 22 output by the predictive analytics system 14 to balance the VPN bandwidth 24 allocated to each of the regions 18A, 18B, . . . 18N by the VPN provider 20 before bandwidth issues occur in any of the regions 18A, 18B, . . . 18N. Weather data 10 and social media sentiment 12 are analyzed by the predictive analytics system 14 to provide the VPN adjustment data 22 for allocation of the VPN bandwidth 24. Non-weather factors that may influence bandwidth usage may be determined by analyzing the social media sentiment. Such non-weather factors may include, but are not limited to, traffic problems, school closures, employee vacation, in-office meetings, and/or the like.

The present invention employs predictive analytics to determine the likelihood that employees will be working from home or from another location outside their office, and therefore using VPN network bandwidth. VPN bandwidth demand is divided into geographical regions, wherein a geographical region may include a district, city, region, country, or any other geographical area. For each geographical region, the amount of required VPN network traffic is predicted using a plurality of factors, including:

A) Weather data for the geography—e.g., adverse weather (such as a snow storm, hurricane, etc.). Historically there is a correlation between adverse weather and an increase in VPN bandwidth usage as more employees choose to work from home.

B) Social media sentiment—the social media activity of employees on networks such as Twitter, Facebook, LinkedIn, IBM Connections, and/or the like can indicate the intentions of employees as to whether they will work from home or visit the office. For example, social media sentiment indicating adverse weather, school closures, or traffic problems (e.g., accidents, road construction, railway closures, etc.) typically increases the likelihood of an employee working from home. In addition, social media sentiment indicating, for example, vacations or in-office meetings may affect the likelihood of employees working in the office.

The predictive analytics system 14 weighs and scores these factors, generating the VPN adjustment data 22, to predict the number of VPN users (and thus the VPN bandwidth 24) in a given time frame for a given geographical region 18. The VPN bandwidth 24 can then be balanced accordingly, based on the VPN adjustment data 22, between geographical regions 18 to ensure that geographical regions that have a high predicted VPN usage are given sufficient resources to satisfy the anticipated VPN network bandwidth demand.

The present invention introduces a process for improving the workload balancing of VPN network bandwidth through prediction ahead of time, allowing a VPN provider to prepare accordingly. This is preferable to real time monitoring which is a reactive method of balancing workload, requires constant monitoring and adjustment, and leads to higher expense as the workload is continually balanced to meet real time demand.

The predictive analytics system 14 of the present invention uses weather data 10 and social media sentiment 12 to estimate VPN network bandwidth across geographical regions. Other possible applications of the present invention may include, for example, determining attendance at events that require travel and in-person attendance such as outdoor sporting events and concerts.

Figure 2:
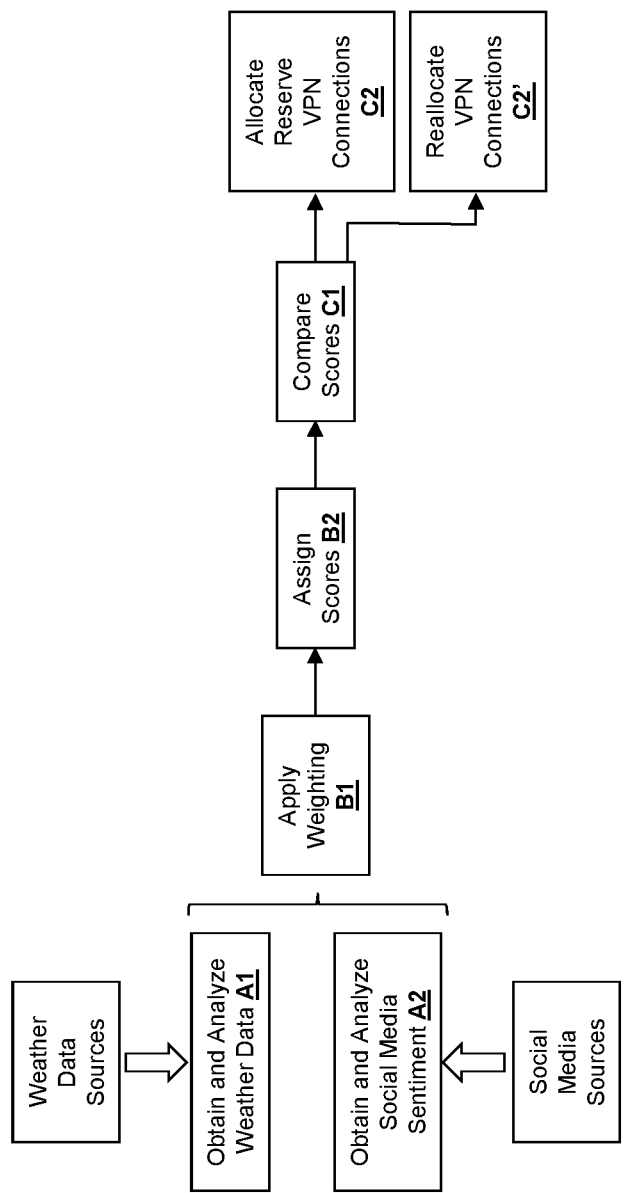
FIG. 2 depicts an illustrative flow diagram of a process for predictive VPN bandwidth, according to embodiments.

In an embodiment, as depicted in FIGS. 1 and 2, the predictive analytics system 14 includes a data gathering stage, a prediction stage, and a workload balancing stage. Each of these stages is described in greater detail below.

Data Gathering Stage

Process A1: For each geographical region 18, weather data 10 (e.g., online weather reports from the National Weather Service, local weather reports available online, and/or any other source of weather data), is obtained and analyzed for a given day by the predictive analytics system 14, looking for adverse weather conditions that may affect travel.

Process A2: The social media networks of employees 16 in each geographical region 18 are analyzed by the predictive analytics system 14 for social media sentiment 12 to determine the likelihood that an employee 16 will work from home or from the office. This may include, for example, status updates from publically available social networks such as Twitter, Facebook, and LinkedIn, and status updates on internal social networks such as IBM Connections. The analysis of these social networks looks for factors including, but not limited to, school closures (e.g., obtained directly from school websites, school closure websites, etc.), traffic problems, road construction, indication of being on vacation, indication of in-office meetings, sickness, etc. Employees' calendars can be mined to obtain vacation data.

Prediction Stage

Process B1: The weather data 10 and social media sentiment 12 gathered in Process A1 and Process A2 for each geographical region 18 are weighted by the predictive analytics system 14 to reflect, based on past VPN bandwidth usage and/or requirements under similar conditions, the relative effect that different types of weather data 10 and social media sentiment 12 may have on VPN bandwidth allocation. Such historical VPN usage data can be obtained and stored by the predictive analytics system 14. The weighting may be provided, for example, using a predictive analytics system 14 such as Smart Cloud Predictive Insights available from IBM. For example, adverse weather such as a snowstorm may be given a higher weight that that given to a traffic jam, since a snowstorm would likely cause more employees to work at home, thereby greatly increasing the VPN bandwidth required by the employees.

Process B2: The weighted weather data 10 and weighed social media sentiment 12 provided in Process B1 for each geographical region 18 are assigned a score by the predictive analytics system 14. In an embodiment, a positive score may be used to indicate an increased likelihood of VPN usage (e.g., a snowstorm may be assigned a score of +150, while a traffic jam may be assigned a lower score of +50). Similarly, a negative score may be used to indicate a decreased likelihood of VPN usage (e.g., all employees are attending an in-office meeting). The scores for each geographical region 18 are combined (e.g., added together, averaged, and/or the like) to provide an indication of the expected level of VPN network bandwidth activity for each geographical region 18, and are used to provide the VPN provider 20 with corresponding VPN adjustment data 22. The types of weighting and scoring described above in Process B1 and B2 are provided for illustrative purposes only, and are not intended to be limiting in any manner.

Workload Balancing Stage

In Process C1, the scores provided in Process B2 for each geographical region 18 are compared by the predictive analytics system 14. As an example, referring again to FIG. 1, assume that the scores provided in Process B2 for each of the geographical regions 18A, 18B, 18C are determined to be as follows by the predictive analytics system 14 (higher scores indicating a greater need for additional VPN bandwidth):
Geographical region 18A: 50;
Geographical region 18B: 150; and
Geographical region 18C: −100.
Thus, based on the scores, it is apparent that geographic regions 18A and 18B require additional VPN bandwidth, while geographic region 18C does not require additional VPN bandwidth.

In this example, before VPN bandwidth balancing is performed by the predictive analytics system 14 in accordance with the present invention, the geographical regions 18A, 18B, 18C are assigned the following number of VPN connections (assuming a total VPN bandwidth 24 of 900 VPN connections):
Geographical region 18A: 300 VPN connections;
Geographical region 18B: 200 VPN connections; and
Geographical region 18C: 200 VPN connections.
A reserve of 200 VPN connections is set aside for VPN bandwidth balancing.

In Process C2, the VPN connections held in reserve are allocated by the predictive analytics system 14 to the various geographical regions 18 based on the comparison performed in Process C1. Continuing the above example, the reserve of 200 VPN connections may be allocated as follows to each of the geographic regions 18:
Geographical region 18A: 350 VPN connections (increase of 50 VPN connections);
Geographical region 18B: 350 VPN connections (increase of 150 VPN connections); and
Geographical region 18C: 200 VPN connections (no increase).
Thus, geographical region 18B is allocated the highest number of the reserve VPN connections, followed by geographical region 18A, while geographical region 18C did not receive any reserve VPN connections.

Alternatively, to balance the VPN bandwidth 24, the existing number of VPN connections assigned to each geographic region 18 may be adjusted accordingly (e.g., in the case that there are no VPN connections held in reserve). As depicted in FIG. 2, in Process C2', the VPN connections may be reallocated by the predictive analytics system 14 to the various geographical regions 18 based on the comparison performed in Process C1. For example, given the scores presented in the above example, the VPN connections may be reallocated by the predictive analytics system 14 as follows (assuming a total existing VPN bandwidth 24 of 700 VPN connections):
Region 18A: 325 VPN connections (increase of 25 VPN connections);
Region 18B: 275 VPN connections (increase of 75 VPN connections); and
Region 18C: 100 VPN connections (decrease of 100 VPN connections).
A combination of the allocation of reserve VPN connections and the reallocation of existing VPN connections may also be used to balance the number of VPN connections provided to each of the various geographical regions 18.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the program product of the present invention may be manually loaded directly in a computer system via a storage medium such as a CD, DVD, etc., the program product may also be automatically or semi-automatically deployed into a computer system by sending the program product to a central server or a group of central servers. The program product may then be downloaded into client computers that will execute the program product. Alternatively the program product may be sent directly to a client system via e-mail. The program product may then either be detached to a directory or loaded into a directory by a button on the e-mail that executes a program that detaches the program product into a directory. Another alternative is to send the program product directly to a directory on a client computer hard drive.

Figure 3:
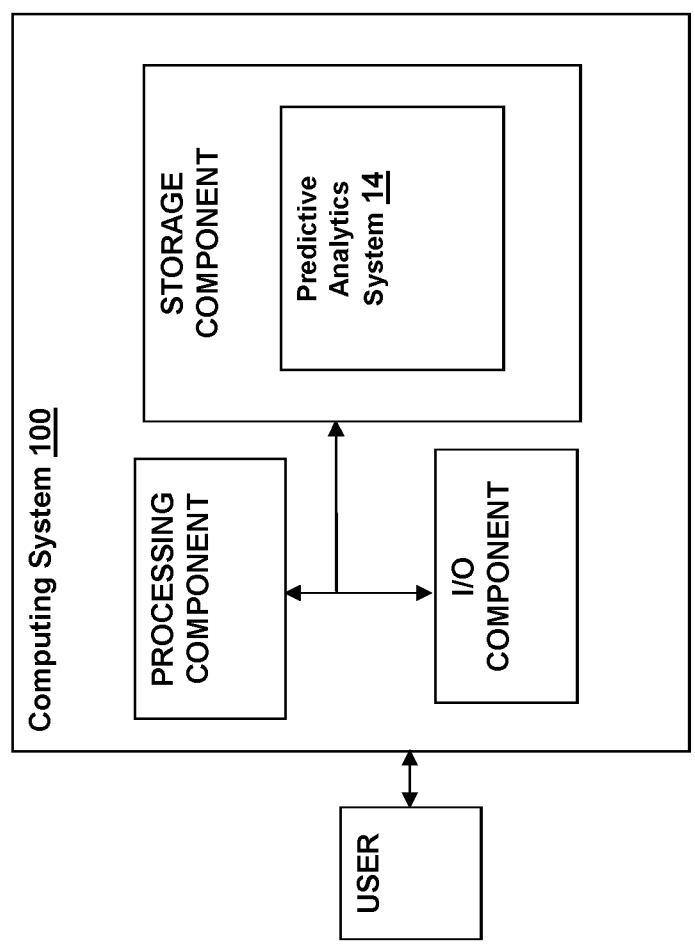
FIG. 3 shows an illustrative environment for implementing the present invention, according to embodiments.

FIG. 3 depicts an illustrative computing system 100 for implementing the present invention, according to embodiments. The computing system 10 may comprise any type of computing device and, and for example includes at least one processor, memory, an input/output (I/O) (e.g., one or more I/O interfaces and/or devices), and a communications pathway. In general, processor(s) execute program code, such as predictive analytics system 14, which is at least partially fixed in memory. While executing program code, processor(s) can process data, which can result in reading and/or writing transformed data from/to memory and/or I/O for further processing. The pathway provides a communications link between each of the components in computing system 100. I/O can comprise one or more human I/O devices, which enable a user to interact with computing system 100.

Technical effects of the systems and methods disclosed herein include balancing network bandwidth by predicting network bandwidth requirements for each of a plurality of geographical regions based on an analysis of weather data and the social media sentiment. The embodiments discussed herein can allow hardware, software, and/or combinations thereof to automatically balance network bandwidth without intervention from a human user. In addition, the embodiments discussed herein can ensure that a VPN has adequate bandwidth to serve all users in all geographical regions during a given time period.

The various embodiments discussed herein can offer several technical and commercial advantages, some of which are discussed herein by way of example. Embodiments of the present disclosure can eliminate the deficiencies suffered by the reactive network bandwidth balancing techniques employed by the prior art. Furthermore, embodiments of the method discussed herein can be used to automatically balance network bandwidth to minimize the over/under subscribing of network resources.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual skilled in the art are included within the scope of the invention as defined by the accompanying claims.

What is claimed is:

1. A method for balancing network bandwidth in a network, comprising:
   analyzing at least one of weather data and social media sentiment for a plurality of geographical regions for factors that may influence network bandwidth usage of a plurality of virtual private network connections in each of the plurality of geographical regions;
   predicting network bandwidth requirements of the plurality of virtual private network connections provided by the network for each of the plurality of geographical regions based on the analysis; and
   balancing the network bandwidth of the network among the plurality of geographical regions based on the predicted network bandwidth requirements of the plurality of virtual private network connections,
   wherein the balancing the network bandwidth of the network among the plurality of geographical regions based on the predicted network bandwidth requirements of the plurality of virtual private network connections further comprises at least one of:

assigning reserve VPN connections to at least one of the plurality of geographical regions based on the predicted network bandwidth requirements; and reallocating existing VPN connections among the plurality of geographical regions based on the predicted network bandwidth requirements, and wherein predicting network bandwidth requirements for each of the plurality of geographical regions further comprises:

assigning a weight to the social media sentiment based on past network bandwidth usage; and assigning a score to the weighted social media sentiment based on past network bandwidth usage.

2. The method of claim 1, wherein predicting network bandwidth requirements for each of the plurality of geographical regions further comprises:

assigning a weight to the weather data based on past network bandwidth usage; and assigning a score to the weighted weather data.

3. The method of claim 2, wherein predicting network bandwidth requirements further comprises:

comparing the scores for each of the plurality of geographical regions; and balancing the network bandwidth among the plurality of geographical regions based on the comparison.

4. The method of claim 1, wherein predicting network bandwidth requirements further comprises:

comparing the scores for each of the plurality of geographical regions; and balancing the network bandwidth among the plurality of geographical regions based on the comparison.

5. A system, including a processor for performing a method for balancing network bandwidth in a network, the method performed by the processor comprising:

analyzing at least one of weather data and social media sentiment for a plurality of geographical regions for factors that may influence network bandwidth usage of a plurality of virtual private network connections in each of the plurality of geographical regions;

predicting network bandwidth requirements of the plurality of virtual private network connections provided by the network for each of the plurality of geographical regions based on the analysis; and balancing the network bandwidth of the network among the plurality of geographical regions based on the predicted network bandwidth requirements of the plurality of virtual private network connections, wherein the balancing the network bandwidth of the network among the plurality of geographical regions based on the predicted network bandwidth requirements of the plurality of virtual private network connections further comprises at least one of:

assigning reserve VPN connections to at least one of the plurality of geographical regions based on the predicted network bandwidth requirements; and reallocating existing VPN connections among the plurality of geographical regions based on the predicted network bandwidth requirements, and wherein predicting network bandwidth requirements for each of the plurality of geographical regions further comprises:

assigning a weight to the social media sentiment based on past network bandwidth usage; and assigning a score to the weighted social media sentiment based on past network bandwidth usage.

6. The system of claim 5, wherein predicting network bandwidth requirements for each of the plurality of geographical regions further comprises:

assigning a weight to the weather data; and assigning a score to the weighted weather data based on past network bandwidth usage.

7. The system of claim 6, wherein predicting network bandwidth requirements further comprises:

comparing the scores for each of the plurality of geographical regions; and balancing the network bandwidth among the plurality of geographical regions based on the comparison.

8. The system of claim 5, wherein predicting network bandwidth requirements further comprises:

comparing the scores for each of the plurality of geographical regions; and balancing the network bandwidth among the plurality of geographical regions based on the comparison.

9. A computer program product comprising program code embodied in at least one non-transitory computer-readable storage medium, which when executed, enables a computer system to implement a method for balancing network bandwidth, the method comprising:

analyzing at least one of weather data and social media sentiment for a plurality of geographical regions for factors that may influence network bandwidth usage of a plurality of virtual private network connections in each of the plurality of geographical regions;

predicting network bandwidth requirements of the plurality of virtual private network connections provided by the network for each of the plurality of geographical regions based on the analysis; and balancing the network bandwidth of the network among the plurality of geographical regions based on the predicted network bandwidth requirements of the plurality of virtual private network connections, wherein the balancing network bandwidth of the network among the plurality of geographical regions based on the predicted network bandwidth requirements of the plurality of virtual private network connections further comprises at least one of:

assigning reserve VPN connections to at least one of the plurality of geographical regions based on the predicted network bandwidth requirements; and reallocating existing VPN connections among the plurality of geographical regions based on the predicted network bandwidth requirements, and wherein predicting network bandwidth requirements for each of the plurality of geographical regions further comprises:

assigning a weight to the social media sentiment based on past network bandwidth usage; and assigning a score to the weighted social media sentiment based on past network bandwidth usage.

10. The computer program product of claim 9, wherein predicting network bandwidth requirements for each of the plurality of geographical regions further comprises:

assigning a weight to the weather data; and assigning a score to the weighted weather data based on past network bandwidth usage.

11. The computer program product of claim 10, wherein predicting network bandwidth requirements further comprises:

comparing the scores for each of the plurality of geographical regions; and balancing the network bandwidth among the plurality of geographical regions based on the comparison.

12. The computer program product of claim 9, wherein predicting network bandwidth requirements further comprises:
- comparing the scores for each of the plurality of geographical regions; and
- balancing the network bandwidth among the plurality of geographical regions based on the comparison.

* * * * *